United States Patent [19]

Silva

[11] Patent Number: 4,959,858
[45] Date of Patent: Sep. 25, 1990

[54] SHIELD DEVICE FOR PUSHBUTTON TELEPHONE

[76] Inventor: Percy Silva, 208 Pacific St., Patterson, N.J. 07503

[21] Appl. No.: 222,179

[22] Filed: Jul. 21, 1988

[51] Int. Cl.⁵ .............................................. H04M 1/66
[52] U.S. Cl. ...................................... 379/445; 379/433
[58] Field of Search ............... 379/445, 433, 437, 451; 70/DIG. 72

[56] References Cited

U.S. PATENT DOCUMENTS

| 3,899,647 | 8/1975 | Nachsi et al. | 379/445 |
| 3,965,310 | 6/1976 | Willy | 379/445 |
| 4,028,508 | 6/1977 | Hall | 379/445 |
| 4,057,697 | 11/1977 | Addoo | 379/445 |
| 4,081,630 | 4/1978 | Washburn et al. | 379/445 |

FOREIGN PATENT DOCUMENTS 3013944  10/1981  Fed. Rep. of Germany ...... 379/445

Primary Examiner—Jin F. Ng
Assistant Examiner—Randall S. Vaas

[57] ABSTRACT

A shield device installable on a telephone handset to overlie the pushbuttons, thereby preventing unauthorized persons from making outgoing calls. The shield device comprises a flexible strap that tightly encircles a mid area of the handset to maintain the shield in place. A keylock is incorporated into the shield device.

1 Claim, 1 Drawing Sheet

SHIELD DEVICE FOR PUSHBUTTON TELEPHONE

BACKGROUND OF THE INVENTION

This invention relates to a shield device installable on the hand grip section of a telephone handset to temporarily prevent manual access to a bank of pushbuttons on an inner surface of the handset. The device is designed to prevent actuation of the pushbuttons for dial-out purpose while permitting otherwise normal use of the handset for receiving incoming calls.

Prior to my invention there have been disclosed at least three shield devices of a somewhat similar nature, e.g. devices disclosed in U.S. Pat. No. 3,899,647 to Z. Nachsi, U.S. Pat. No. 4,028,508 to J. Hall, and U.S. Pat. No. 4,057,697 to M. Addoo. My invention is directed to an improvement on the devices shown in those patents.

SUMMARY OF THE INVENTION

My invention contemplates a flexible resilient plastic strip sized to tightly encircle the hand grip section of a telephone handset. The meeting ends of the plastic strip carry a keeper plate and key lock, which cooperatively hold the strip in position on the telephone handset. A rigid protector plate is secured to the plastic strip to overlie a bank of push buttons, thereby preventing actuation of the buttons for dial-out purposes.

A primary object of the invention is to provide a shield device that will not scratch, mar or injure the surface of the telephone handset.

Another object is to provide a shield device that includes a strap-like mechanism of minimum thickness, such that the telephone handset can be handled in essentially normal fashion, even with the shield device installed thereon.

A further object is to provide a shield device of unitary one-piece design, whereby the device can be stored during non-use periods without fear that components will be lost or mislaid.

An additional object is to provided a shield device that will be light in weight and low in manufacturing cost.

THE DRAWINGS

DESCRIPTION OF A PREFERRED EMBODIMENT

Figure 1:
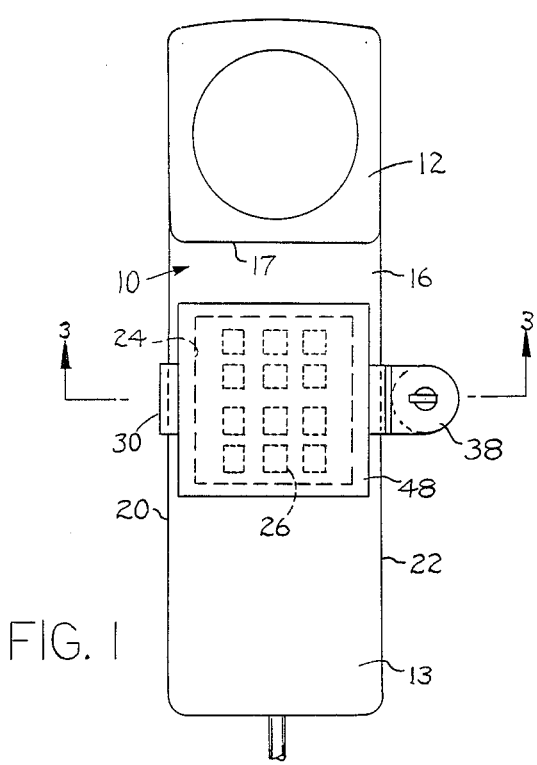
FIG. 1 is front elevational view of a shield device constructed according to the invention. The shield device is shown installed on a conventional telephone handset.
Figure 2:
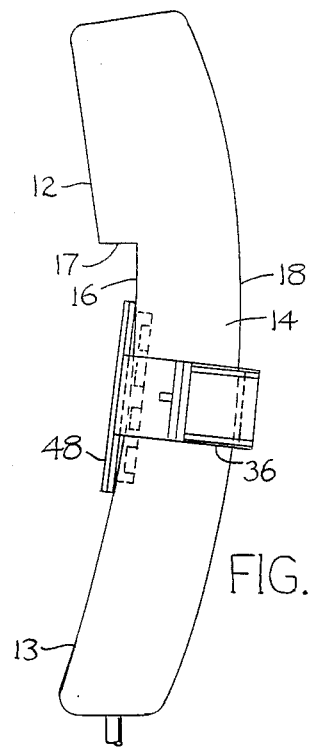
FIG. 2 is a side elevational view of the FIG. 1 assembly.

The drawings show a conventional telephone handset of the trimline type. The handset comprises an elongated three dimensional body 10 having a receiver 12 at its upper end and a transmitter 13 at its lower end. An intermediate section 14 is sized for gripment and partial encirclement of the handset by the users hand.

Hand grip section 14 has an inner surfaoe 16 an outer surface 18, and two interconnecting side surfaces 20 and 22. Inner surface 16 has a recessed area 24 that accommodates a bank of push buttons 26 (used to dial outgoing numbers).

In use, the telephone handset is held in one of the user's hands with inner surface 16 near the user's face; receiver 12 is located against the user's left ear, and transmitter 13 is located in near adjacency to the user's mouth (assuming the user is gripping the handset with his left hand). The user's thumb extends across inner surface 16 of the handset just below receiver 12, while the palm area of the hand rests against side surface 20. The fingers extend laterally across outer surface 18, while the terminal digits of the fingers curl against side surface 22. The handset is held in an upright position close against the user's face.

When the handset is not in use it is stored in a holder, not shown. The handset is suspended from a ledge (switch operator bar) located beneath under surface 17 of receiver 12; inner surface 16 of the handset faces the rear wall of the holder.

My invention relates to a shield device installable on hand grip section 14 of the handset for temporarily preventing access to pushbuttons 26, thereby preventing unauthorized persons from using the phone to make outgoing calls. With the shield device installed on the handset the phone can be used to receive incoming calls. The shield device can be removed from the handset when it is desired to use the phone for outgoing calls (normal operational mode).

The improved shield device comprises a flexible strap 30 formed of a plastic material, e.g. nylon. The strap is of sufficient length as to be capable of tightly encircling hand grip section 14 of the handset. With strap 30 properly installed on the handset the free ends 32 and 34 of the strap meet at an intermediate point on face 22 of hand grip section 14. Cooperable locking mechanisms are carried on the free ends of the strap to releaseably retain the strap in position on the telephone handset.

The cooperating locking mechanisms comprise a key lock 36 and cooperating keeper plate 38. Plate 38 comprises an angle plate member having one leg anchored onto the exposed facial surface of strap end 32 by means of one or more rivets 40; the other leg of the angle member projects normal to the strap surface.

Key lock 36 is a cylinder (barrel) lock having tumblers and internal key-operated plug rotatable on an axis 42. A latchbolt 44 extends from the plug through a non-circular opening in keeper plate 38. Key lock 36 has a press fit in an opening in a second angle member 46; welding or other afixment means may be used to enhance the press fit connection. Angle member 46 includes a leg that is anchored onto the exposed facial surface of strap end 34 by means of plastic rivets 40.

As previously noted, strap 30 is a flexible plastic material, e.g. nylon. It may be die-cut from a flat strip into the desired length and configuration. The portion of the strap that overlies the bank of pushbuttons 26 is of greater width than the remaining portion of the strip, as seen for example in FIG. 1. If necessary, the wider portion of the strip may be reinforced against flexure by the addition of a rigid protector plate 48.

Strip 30 can be left in the flat state; installation of the device on the telephone handset than involves looping the strip 30 material around hand grip section 14 of the handset, and thereafter turning the key in lock 36 to enable latch bolt 44 to operatively engage the opening in keeper plate 38.

The shield device may be somewhat easier to manipulate (during installation on the handset) if strip 30 is a stiff resilient strip preformed into a three dimensional configuration mated to the facial contours on the telephone body. The preforming operation involves primarily remolding the strip into the configuration shown in FIG. 3, i.e. forming four right angle bends in the material (corresponding to the corners on the handset). It is believed that the reforming operation can be accomplished by a known thermoforming process that includes positioning the plastic strip around a mandrel of the desired shape and heating the strip to form corners.

Figure 3:
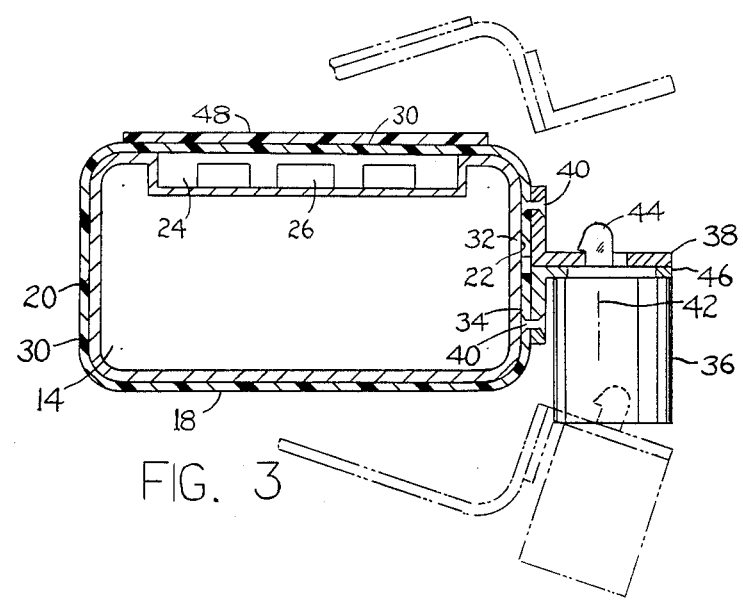
FIG. 3 is an enlarged sectional view taken on line 3—3 in FIG. 1.

FIG. 3 shows in dashed lines the position of a three dimensional strip 30 during installation or removal of the shield device. The ends of the strip are manually held apart to insert or remove the telephone handset to or from the circumscribed space. The resilience of the strip material causes it to tightly encircle the telephone handset in the absence of countervailing forces.

Strip 30 could be formed of a woven plastic material, similar to that used in automotive seat belts. The flexibility of such a material is sufficient that it can be wrapped around telephone handset body in the desired fashion.

FEATURES OF THE INVENTION

An important feature is the fact that strip 30 is formed of a flexible plastic material that will not scratch, mar or deface the surface of the telephone handset, even though the strip tightly encircles the handset. The flexible strip conforms closely to the telephone handset surface with a relatively large contact area; the strip will not slip from its desired position on the handset.

U.S. Pat. No. 3,899,647 to Z. Nachsi shows a shield device that is clamped onto a telephone handset (see FIG. 4). That shield device is formed of metal or hard rigid plastic, such that it can scratch or mar the telephone surface in a fashion not possible with my devices.

Another feature of my invention is the relatively small cross sectional thickness of flexible strap 30. The strap (strip) closely follows the contour of the telephone handset, such that the user can comfortably grasp the telephone when the strap is in use. The corresponding shield device of U.S. Pat. No. 3,899,647 presents sharp corners and a bulkiness that interfere with a comfortable grasp of the handset.

A further feature of interest is the location of my keylock 36. The lock is located on one of the side surfaces of the telephone handset. The user is able to curl his fingers around the outer surface 18 of the handset without interference from the lock.

In the device shown in U.S. Pat. No. 3,899,647 (FIG. 4) a lock 10' is mounted on a wall that overlies the bank of pushbuttons. In such a location the lock would tend to interfere with placement of the handset into the holder (during storage periods). The lock would project an undue distance away from the push buttons so as to strike the rear wall of the holder before the handset could be properly supported in the holder.

I am able to use a fairly large and effective lock without fear that the lock will interfere with a comfortable grasp of the telephone handset or proper storage of the handset in its holder.

I claim:
1. In association with a telephone handset which comprises an elongated three dimensional body having a receiver at one of its ends, a transmitter at its other end, and a hand grip section (14) therebetween; said hand grip section having a first inner face (16), a second outer face (18), and third and fourth side faces (20 and 22) interconnecting the inner and outer faces; and a bank of pushbuttons arranged on the inner face of the hand grip section: the improvement comprising a shield device installable on the hand grip section for temporarily preventing manual access to the pushbuttons; said shield device comprising a flexible plastic strap sized to tightly encircle and frictionally contact the hand grip section of the handset, said flexible strap having two free ends thereof oriented to meet at an intermediate point on the fourth side face of the handset hand grip section; a first rigid angle member (38) having a first leg thereof facially engaged with a face of said strap at one of its free ends; means (40) securing said first leg of said first angle member to said strap; said first rigid angle member having a second leg thereof projecting normal to the associated strap face; a second angle member (46) having a first leg thereof facially engaged with a face of said strap at its other free end; means securing said first leg of said second angle member to said strap; and second rigid angle member having a second leg thereof projecting normal to the associated strap face; said second leg of said first angle member constituting a keeper plate; a key lock (36) mounted on the second leg of said second angle member; said key lock including a latch bolt extendable through an opening in the keeper plate to retain the flexible strap in position on the hand grip section of the handset except when the key lock is operated to its unlocked condition; said plastic strap having a section thereof sized to overlie the bank of pushbuttons; and a rigid protector plate (48) secured to said strap section to reduce the flexibility of said strap section.

* * * * *